US011120408B2

(12) United States Patent
Dantuluri et al.

(10) Patent No.: US 11,120,408 B2
(45) Date of Patent: Sep. 14, 2021

(54) SCHEDULING CONFLICT NOTIFICATION

(71) Applicant: Microsoft Technology Licensing, LLC, Redmond, WA (US)

(72) Inventors: Jagannatha Raju Dantuluri, Sammamish, WA (US); Karan Singh, Seattle, WA (US); Shira Weinberg, Tel Aviv (IL); Richa Prasad, Seattle, WA (US); Colleen Elizabeth Hamilton, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 873 days.

(21) Appl. No.: 14/270,585

(22) Filed: May 6, 2014

(65) Prior Publication Data

US 2015/0324753 A1   Nov. 12, 2015

(51) Int. Cl.
*G06Q 10/10*   (2012.01)
(52) U.S. Cl.
CPC ..... *G06Q 10/1095* (2013.01); *G06Q 10/1093* (2013.01)
(58) Field of Classification Search
CPC . G06F 3/048; G06Q 10/1095; G06Q 10/1093
See application file for complete search history.

(56) References Cited

U.S. PATENT DOCUMENTS

| 5,790,974 | A  | 8/1998 | Tognazzini |
| 6,603,489 | B1 | 8/2003 | Edlund et al. |
| 6,898,569 | B1 | 5/2005 | Bansal et al. |
| 8,429,103 | B1 | 4/2013 | Aradhye et al. |

(Continued)

FOREIGN PATENT DOCUMENTS

| WO | 2003107129 A2 | 12/2003 |
| WO | 2014018687 A1 | 1/2014 |

OTHER PUBLICATIONS

"On Time is a Location and Traffic-Aware Schedule App tha Ensures You'll Never Leave Late Again", Adam Dachis, Aug. 1, 2011, Available at: http://supersimple.typepad.com/blog/2011/01/ontime-is-a-location-and-traffic-aware-schedule-app-that-ensures-youll-never-leave-late-again-video-1.html, 4 pgs.

(Continued)

*Primary Examiner* — Daniel Samwel

(57) ABSTRACT

One or more techniques and/or systems are provided for surfacing scheduling conflicts and/or for facilitating appointment scheduling based upon conflict detection. A user may maintain user appointment data comprising user appointments (e.g., calendar entries within a work calendar). Because user activity may not be fully reflected in the appointment data (e.g., no calendar entries for routine grocery shopping, soccer practice, etc.), potential conflicts may exist between user appointments and the true availability of the user. Accordingly, user signals (e.g., email(s), location check-ins, etc. associated with soccer practice) may be evaluated to generate a user inferred behavior pattern that may be used to identify a potential conflict with a user appointment (e.g., where the user consents to the gathering and/or use of such user signals). A warning of the potential conflict may be surfaced to the user (e.g., a Tuesday dinner calendar meeting conflicts with routine soccer practice on Tuesday evenings).

20 Claims, 12 Drawing Sheets

(56) References Cited

U.S. PATENT DOCUMENTS

| | | | |
|---|---|---|---|
| 8,442,758 B1 | 5/2013 | Rovik et al. | |
| 8,473,197 B2 | 6/2013 | Horivtz | |
| 8,930,820 B1* | 1/2015 | Elwell | H04L 67/18 |
| | | | 715/738 |
| 9,444,774 B2 | 9/2016 | Krishna et al. | |
| 2004/0064567 A1 | 4/2004 | Doss et al. | |
| 2007/0016646 A1 | 1/2007 | Tendjoukian et al. | |
| 2007/0294304 A1 | 12/2007 | Bassett et al. | |
| 2008/0119132 A1 | 5/2008 | Rao | |
| 2008/0140488 A1 | 6/2008 | Oral et al. | |
| 2008/0167938 A1 | 7/2008 | Meisels et al. | |
| 2009/0152349 A1 | 6/2009 | Bonev et al. | |
| 2009/0157513 A1 | 6/2009 | Bonev et al. | |
| 2009/0157693 A1 | 6/2009 | Palahnuk | |
| 2009/0164259 A1 | 6/2009 | Mizrachi et al. | |
| 2009/0292690 A1* | 11/2009 | Culbert | G06Q 10/109 |
| 2010/0162105 A1 | 6/2010 | Beebe et al. | |
| 2010/0175001 A1 | 7/2010 | Lazarus et al. | |
| 2010/0192162 A1 | 7/2010 | Conner et al. | |
| 2011/0090078 A1 | 4/2011 | Kim et al. | |
| 2011/0130958 A1 | 6/2011 | Stahl et al. | |
| 2011/0153629 A1 | 6/2011 | Lehmann | |
| 2011/0197236 A1 | 8/2011 | Rao | |
| 2011/0239146 A1 | 9/2011 | Dutta et al. | |
| 2011/0252351 A1 | 10/2011 | Sikora et al. | |
| 2011/0317523 A1 | 12/2011 | Lance et al. | |
| 2012/0010805 A1* | 1/2012 | Wilkerson | G06Q 10/109 |
| | | | 701/538 |
| 2012/0117568 A1 | 5/2012 | Plotkin | |
| 2012/0158448 A1 | 6/2012 | Perrella et al. | |
| 2012/0233563 A1* | 9/2012 | Chakra | G06Q 10/1093 |
| | | | 715/772 |
| 2012/0259927 A1 | 10/2012 | Lockhart | |
| 2012/0290956 A1 | 11/2012 | Lance et al. | |
| 2013/0054505 A1 | 2/2013 | Ross et al. | |
| 2013/0054613 A1* | 2/2013 | Bishop | G06F 16/958 |
| | | | 707/748 |
| 2013/0231864 A1 | 9/2013 | Stahl et al. | |
| 2013/0246520 A1 | 9/2013 | Belvin et al. | |
| 2014/0035949 A1 | 2/2014 | Singh et al. | |
| 2014/0149592 A1 | 5/2014 | Krishna et al. | |
| 2014/0149771 A1 | 5/2014 | Krishna et al. | |
| 2014/0188541 A1* | 7/2014 | Goldsmith | H04L 67/306 |
| | | | 705/7.19 |
| 2014/0280292 A1 | 9/2014 | Skinder | |
| 2014/0280575 A1 | 9/2014 | Cowan | |
| 2015/0186110 A1 | 7/2015 | Kannan | |
| 2015/0199649 A1 | 7/2015 | Weinberg | |
| 2015/0205465 A1 | 7/2015 | Robison et al. | |
| 2015/0208219 A1* | 7/2015 | Bowers | H04W 4/18 |
| | | | 455/414.3 |
| 2016/0249319 A1 | 8/2016 | Dotan-cohen et al. | |

OTHER PUBLICATIONS

"Types of Event Notifications", May 16, 2013, Available at: https://support.google.com/calendar/answer/37503?hl=en, 2 pgs.

PCT Second Written Opinion in Application PCT/US2015/028678, dated May 6, 2016, 6 pages.

PCT International Search Report in PCT/US2014/072415, dated Jun. 18, 2015, 11 pages.

"International Search Report and Written Opinion Issued in PCT Patent Application No. PCT/US2015/028678", dated Jul. 20, 2015, 10 Pages.

U.S. Appl. No. 14/154,554, Office Action dated Oct. 7, 2016, 17 pages.

PCT International Preliminary Report on Patentability Issued in PCT Application No. PCT/US2015/028678, dated Aug. 26, 2016, 7 Pages.

U.S. Appl. No. 14/154,554, Amendment and Response filed Jan. 9, 2017, 31 pages.

U.S. Appl. No. 14/154,554, Office Action mailed Apr. 25, 2017, 19 pages.

European Search Report in Application 14831138.4, dated May 3, 2017, 7 pages.

U.S. Appl. No. 14/154,554, Amendment and Response filed Aug. 25, 2017, 38 pages.

"Tis the Season to Ride Your Own Waze", Retrieved From: https://blog.waze.com/search/labei/New%20Versions, 49 Pages.

"Non Final Office Action Issued in U.S. Appl. No. No. 14/154,554", dated Sep. 28, 2017, 24 Pages.

"Office Action Issued in European Patent Application No. 14831138. 4", dated Jun. 12, 2018, 4 Pages.

"Office Action and Search Report Issued in Mexican Patent Application No. MX/a/2016/009172", dated Feb. 20, 2018, 5 Pages.

* cited by examiner

SCHEDULING CONFLICT NOTIFICATION

BACKGROUND

Many users maintain user calendars for managing meetings, appointments, and/or specific tasks. For example, a user may maintain a social network calendar within a social network and/or an office productivity calendar within an office suite. The user may populate such user calendars with user calendar entries, such as a work meeting entry, a get gas entry, and/or other user entries.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

Among other things, one or more systems and/or techniques for surfacing scheduling conflicts are provided herein. A user may maintain user appointment data through various applications and/or services. For example, the user may maintain user appointment data within a work calendar. The user may not adequately update the user appointment data and/or may not specify actual availability at a level of granularity that may otherwise take into account user behavior patterns that affect availability. For example, the user may overlook adding calendar entries for driving time, taking a child to soccer practice, routine grocery shopping, routine Friday night date nights with a spouse, and/or other routine behavior patterns of the user. Accordingly, given user consent, a set of user signals (e.g., time and location data of a user mobile device may be evaluated to determine that the user routinely goes to a movie theatre on Friday nights from 7:00 pm to 10:00 pm with a spouse) may be evaluated to generate a user inferred behavior pattern of the user. The user may take affirmative action to provide opt-in consent to allow access to user signals (e.g., a social network profile, a device location, emails, messages, etc.), such as for the purpose of detecting scheduling conflicts.

User appointment data (e.g., the work calendar of the user) may be evaluated to identify a potential conflict (e.g., an inference that a potential conflict may exist) between a user appointment for the user (e.g., a Friday night dinner meeting scheduled through the work calendar by a co-worker) and the user inferred behavior pattern (e.g., the Friday night spouse date night). A warning of the potential conflict may be surfaced to the user. For example, a notification (e.g., an audible notification, a warning notification displayed through a scheduling interface, an email, a mobile alert, etc.) may be provide to the user and/or an appointment creator of the user appointment (e.g., an email or message may be sent to the co-worker), which may indicate that the Friday night dinner meeting within the work calendar may conflict with the user's usual routine of having Friday night date night with the spouse. In an example, a reschedule user appointment suggestion may be provided (e.g., a new proposed time for the Friday night dinner meeting; a suggested message to send to the spouse about rescheduling; etc.). In this way, given user consent, inferred behavior patterns of the user may be used to identify and provide warnings of scheduling conflicts.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
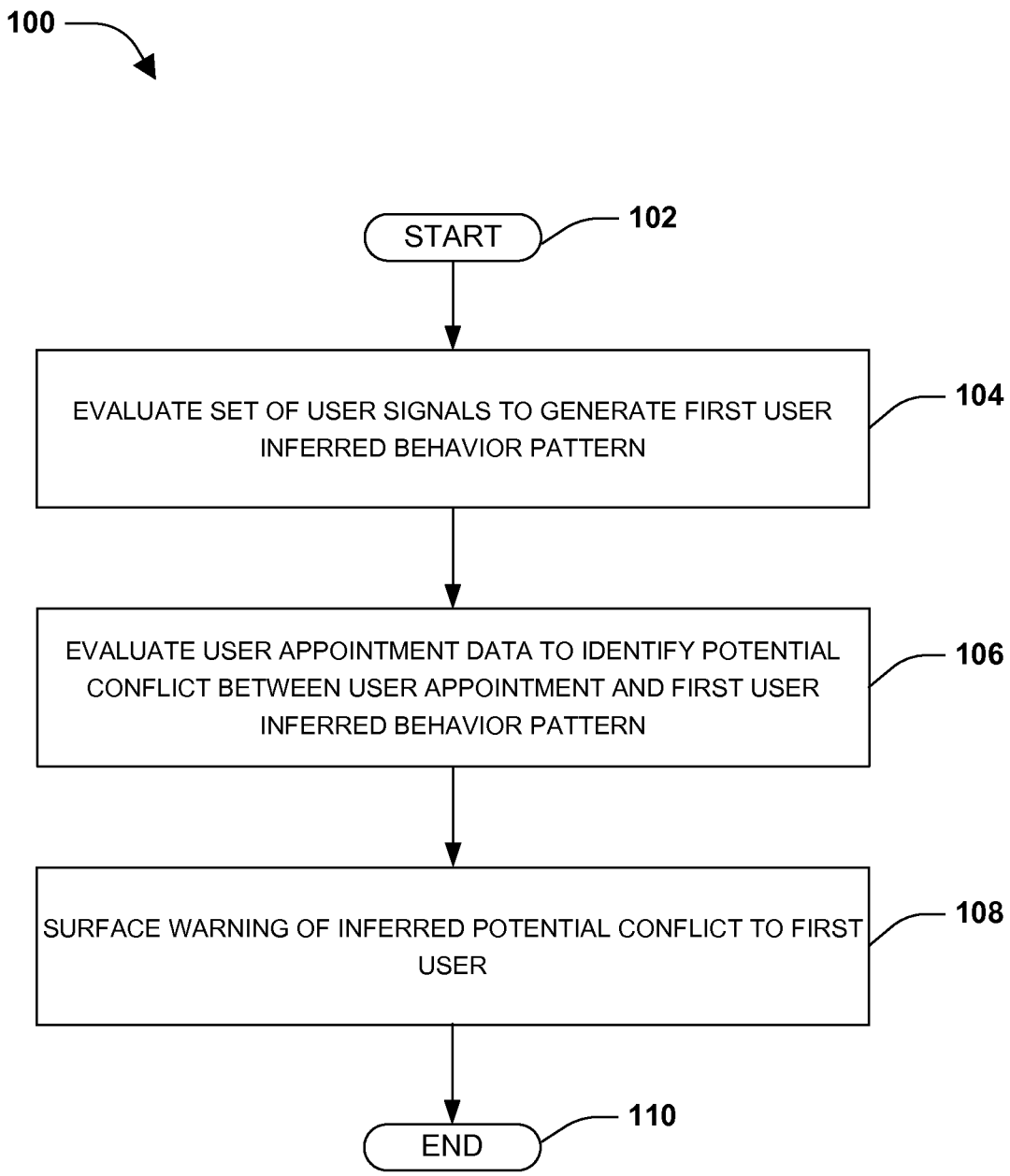
FIG. 1 is a flow diagram illustrating an exemplary method of surfacing scheduling conflicts.

The claimed subject matter is now described with reference to the drawings, wherein like reference numerals are generally used to refer to like elements throughout. In the following description, for purposes of explanation, numerous specific details are set forth to provide an understanding of the claimed subject matter. It may be evident, however, that the claimed subject matter may be practiced without these specific details. In other instances, structures and devices are illustrated in block diagram form in order to facilitate describing the claimed subject matter.

One or more techniques and/or systems for surfacing scheduling conflicts are provided herein. A user may maintain user appointments within user appointment data (e.g., meetings, events, tasks, and/or other appointments may be maintained within a user personal calendar). Because the user appointment data may not take into account all behavior patterns of the user (e.g., the user personal calendar may not indicate that the user routinely drives a child to soccer practice on Tuesdays at 3:00 pm), a set of user signals may be evaluated, given user consent, to generate a user inferred behavior pattern of the user. The user inferred behavior pattern may be used to evaluate the user appointment data to identify a potential conflict between a user appointment for the user and the user inferred behavior pattern (e.g., a Tuesday coworker outing from 1:00 pm-6:00 pm may conflict with the soccer practice transportation at 3:00 pm). Accordingly, a warning of the potential conflict may be surfaced to the user.

An embodiment of surfacing scheduling conflicts is illustrated by an exemplary method 100 of FIG. 1. At 102, the method starts. At 104, a set of user signals may be evaluated to generate a first user inferred behavior pattern of a first user. The first user may take affirmative action to provide opt-in consent to allow access to and/or use of user signals (e.g., a social network profile, a device location, emails, messages, etc.), such as for the purpose of detecting scheduling conflicts (e.g., where the user responds to an informative prompt regarding the collection and/or use of user signals). In an example, a device context of a device associated with the first user may be evaluated to identify an activity of the first user (e.g., an activity routinely/consistently performed by the first user) as a user signal. The device context may comprise a device location, a device time, a mode of transportation, a device location check-in (e.g., the first user may routinely visit a movie theater on Fridays), an alarm (e.g., a wake-up alarm indicating a start to the user's day), a charging state, a connectivity state (e.g., being connected to a home wifi connection may indicate that the user is at home, while being connected to a vehicle Bluetooth connection may indicate that the user is traveling), and/or user data stored on the device. In another example, a social network profile of the first user may be evaluated to identify an activity of the first user as a user signal (e.g., the first user may publish a social network post indicating that the first user signed up for spinning classes on Monday mornings for the next 9 months). In another example, the set of user signals may be used to generate a shadow calendar comprising one or more shadow calendar entries corresponding to inferred behavior of the user (e.g., a Monday morning shadow calendar entry may be automatically created based upon the social network post). The shadow calendar may be used to identify the first user inferred behavior pattern (e.g., a Monday morning spinning class user inferred behavior pattern). In an example, the first user inferred behavior pattern may correspond to routine behavior patterns of the first user, as opposed to a user created appointment such as a calendar entry that may already be explicitly defined by a user.

At 106, user appointment data for the first user may be evaluated to identify a potential conflict between a user appointment for the first user and the first user inferred behavior pattern. The user appointment data may correspond to a variety of user appointment information, such as a user work calendar entry, a user social network calendar entry, a conversation between the first user and a second user (e.g., the user and/or other users may take affirmative action to provide opt-in consent to allow a device to receive and/or evaluate the conversation, such as in real time, to identify a potential user appointment discussed by the first user and/or other users). In an example, the user appointment corresponds to a Monday breakfast appointment with the first user and a friend, and the first user inferred behavior pattern corresponds to the Monday morning spinning class. A potential conflict may be detected between the Monday breakfast appointment and the Monday morning spinning class.

At 108, a warning of the potential conflict may be surfaced to the user. In an example, an audible notification of the warning may be provided, such as during the conversation about the potential user appointment between the first user and the second user. In another example, a mobile alert of the warning may be provided. In another example, the warning may be displayed through a user interface, such as a scheduling interface. In another example, a notification of the potential conflict may be provided to an appointment creator of the user appointment (e.g., the friend, whom created the user appointment for breakfast, may be notified of the potential conflict). In another example, a reschedule user appointment suggestion may be provided to the first user (e.g., a suggestion to send a message to the friend about rescheduling for 11:30 am based upon scheduling information for the spinning class indicating that the spinning class ends at 10:00 am, which would give the first user time to shower and drive to breakfast/brunch). In an example, user feedback for the warning may be received (e.g., the user may indicate that the user cancelled a membership to the spinning class). Accordingly, the first user inferred behavior pattern (e.g., and/or the shadow calendar) may be adjusted based upon the user feedback. For example, a Monday morning spinning class shadow calendar entry may be removed from the shadow calendar and/or a confidence metric may be decreased for a Monday morning spinning class user inferred behavior pattern.

In an example of surfacing scheduling conflicts, a user availability request may be received from the first user (e.g., a voice command "am I available Tuesday afternoon for tennis?" may be received by a smart phone of the first user). The user availability request may specify a potential user appointment, such as Tuesday afternoon tennis. The shadow calendar, maintained for the first user, may be accessed to identify one or more shadow calendar entries (e.g., at least one shadow calendar entry may correspond to the first user inferred behavior pattern). Responsive to the potential user appointment (e.g., Tuesday afternoon tennis) conflicting with a shadow calendar entry (e.g., a shadow calendar entry may indicate that the user routinely meets a client on Tuesday afternoon), a conflict response may be provided to the first user. An availability suggestion may be provided for the potential user appointment (e.g., a suggestion to schedule tennis for 2:00 pm based upon the client meeting generally ending at 1:00 pm). Responsive to the potential user appointment not conflicting with at least one shadow calendar entry, an availability confirmation may be provided to the first user. In this way, the first user may be warned of potential conflicts between user inferred behavior patterns and user appointments. At 110, the method ends.

Figure 2A:
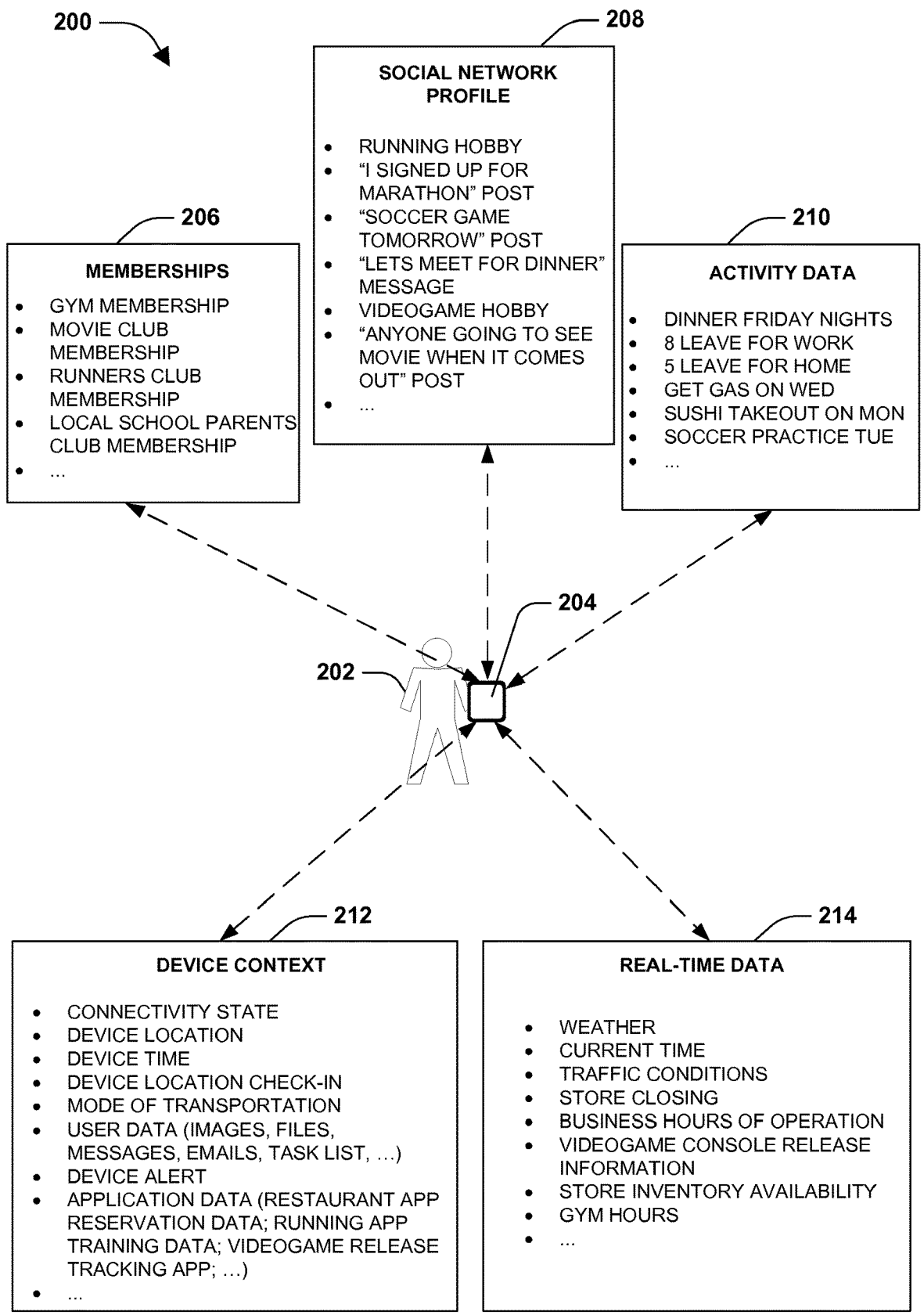
FIG. 2A is an illustration of an example of identifying user signals associated with a user of a device.

FIG. 2A illustrates an example 200 of identifying user signals associated with a user 202 of a computing device 204 (e.g., where the user consents to the gathering and/or use of such signals). In an example, memberships 206 of the user 202 may be identified as user signals (e.g., a gym membership may be used to identify a workout location for the user 202; a movie club membership may be used to identify a preferred movie theater and/or coupons for the user 202; etc.). In another example, a social network profile 208 may be evaluated to identify user signals (e.g., an "I signed up for marathon" post may be used to identify a marathon activity; a "lets meet for dinner" message may be used to identify a dinner activity; etc.). In another example, a device context 212 may be evaluated to identify user signals (e.g., reservation data of a restaurant app on the device 204 may be used to identify a dinner activity; a videogame release tracking app may be used to identify a preorder video game console activity; etc.). In another example, real-time data 216 may be evaluated to identify and/or evaluate user signals (e.g., gym hours; store inventory available for a videogame console; a closing of a coffee shop that the user routinely visits on Saturday; etc.). In another example, activity data 210 may be inferred based upon user signals (e.g., a sushi takeout activity on Mondays may be identified based upon device locations of the device 204 on Mondays corresponding to a location of a sushi restaurant; a soccer practice activity on Tuesdays may be identified based upon device locations of the device 204 on Tuesdays corresponding to a location of a soccer field; etc.).

Figure 2B:
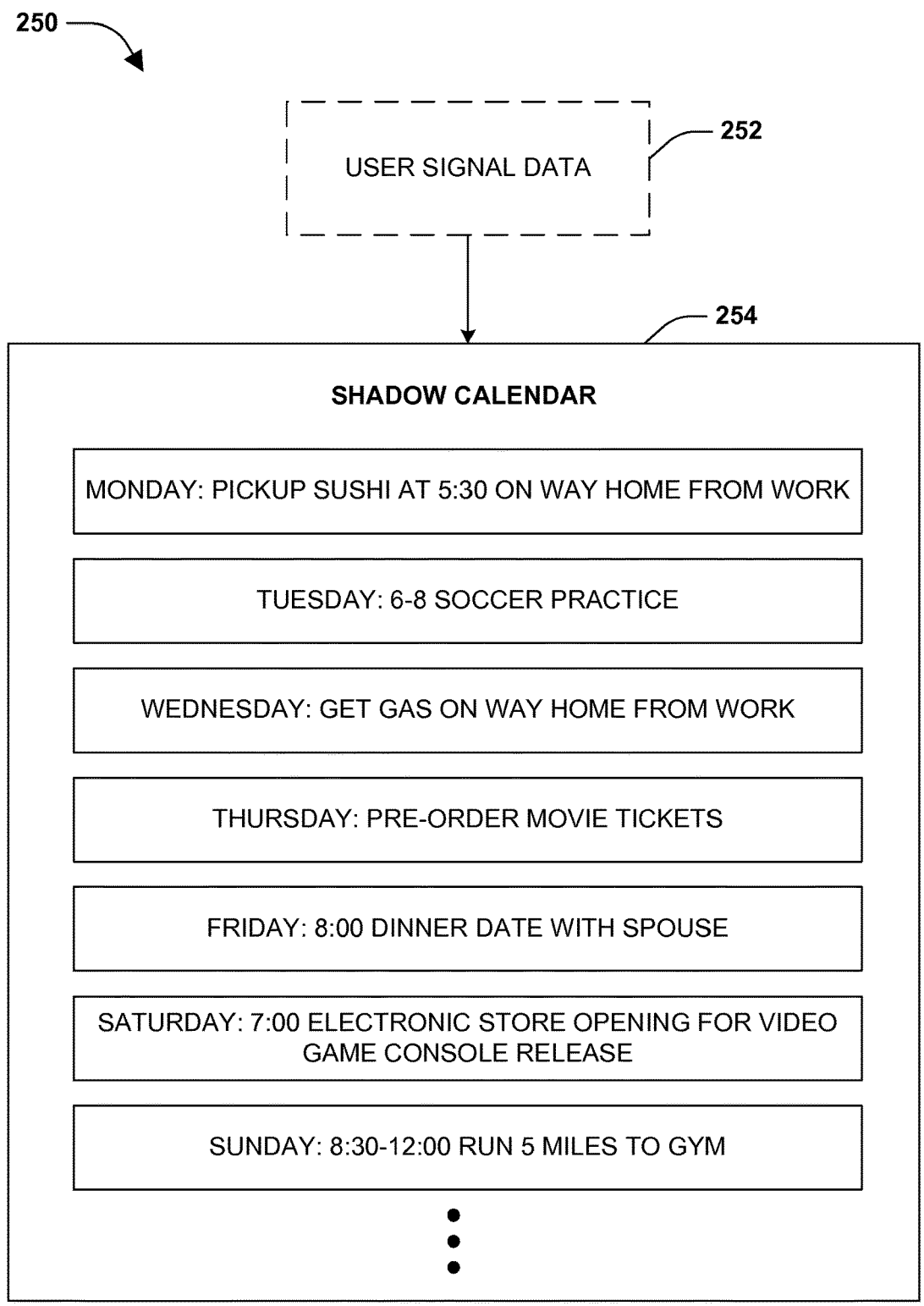
FIG. 2B is an illustration of an example of constructing a shadow calendar based upon user signal data.

FIG. 2B illustrates an example of constructing a shadow calendar 254, given user consent, based upon user signal data 252 (e.g., user signal data identified in the example 200 of FIG. 2A). The shadow calendar 254 may be populated with one or more shadow calendar entries derived/inferred from the user signal data 252. In an example, a pickup sushi activity shadow calendar entry may be populated within the shadow calendar 254 based upon temporal and/or location information indicating that the user routinely picks up sushi on Mondays. In another example, a soccer practice activity shadow calendar entry may be populated within the shadow calendar 254 based upon a soccer team membership of the user with a soccer team and/or a soccer practice schedule published through a website of the soccer team. In another example, a get gas activity shadow calendar entry may be populated within the shadow calendar 254 based upon a current gas status of a user vehicle. In another example, a pre-order movie tickets activity shadow calendar entry may be populated within the shadow calendar 254 based upon a social network message of the user indicating a movie date night to a movie that is to be released on Thursday. In another example, a dinner date with spouse shadow calendar activity entry may be populated within the shadow calendar 254 based upon an email between the user and the user's spouse. In another example, a videogame console release activity shadow calendar entry may be populated within the shadow calendar 254 based upon a preorder receipt file on the device 204 of FIG. 2A. In another example, a run to gym activity shadow calendar entry may be populated within the shadow calendar 254 based upon an email on the device 204 mode of transportation indicating a running transportation mode on Sundays to a gym location. In this way, the shadow calendar 254 may be maintained based upon the user signal data 252.

Figure 2C:
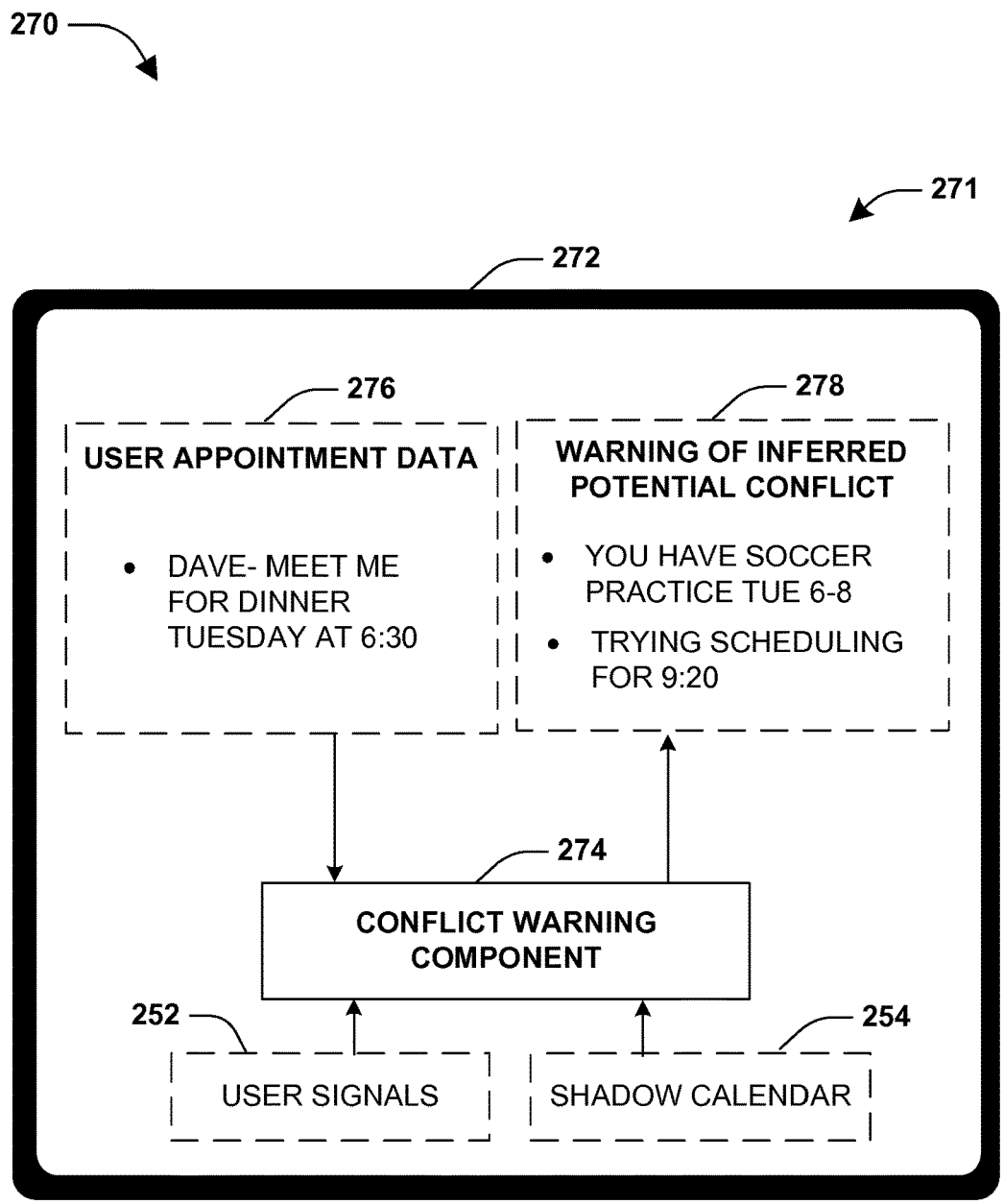
FIG. 2C is a component block diagram illustrating an exemplary system for surfacing scheduling conflicts.

FIG. 2C illustrates an example 270 of a system 271 for surfacing scheduling conflicts. The system 271 comprises a conflict warning component 274 associated with a computing device 272 of a first user. The conflict warning component 274 may identify user appointment data 276 for the first user (e.g., a user work calendar). For example, the conflict warning component 274 may identify a Tuesday dinner meeting at 6:30 pm user appointment within the user appointment data 276. The conflict warning component 274 may evaluate user signals 252 and/or a shadow calendar 254, as illustrated in FIGS. 2A-2B, to identify a first user inferred behavior pattern for the first user. For example, the first user inferred behavior pattern may indicate that the user has soccer practice from 6:00 pm to 8:00 pm on Tuesdays. The conflict warning component 274 may identify a potential conflict between the Tuesday dinner meeting at 6:30 pm user appointment and the first user inferred behavior pattern. Accordingly, the conflict warning component 274 may provide a warning 278 of the potential conflict, such as through a user interface of the computing device 272. The warning 278 may indicate that the user has soccer practice on Tuesdays from 6:00 pm to 8:00 pm, which may conflict with the Tuesday dinner meeting at 6:30 user appointment. The warning 278 may specify a reschedule user appointment suggestion for the first user to reschedule to 9:20 pm based upon a location of the soccer practice and a location of the dinner meeting. Rescheduling functionality may be exposed to the first user, such that the first user may invoke the rescheduling functionality to automatically contact an appointment creator of the Tuesday dinner meeting about rescheduling to 9:20 pm.

Figure 3A:
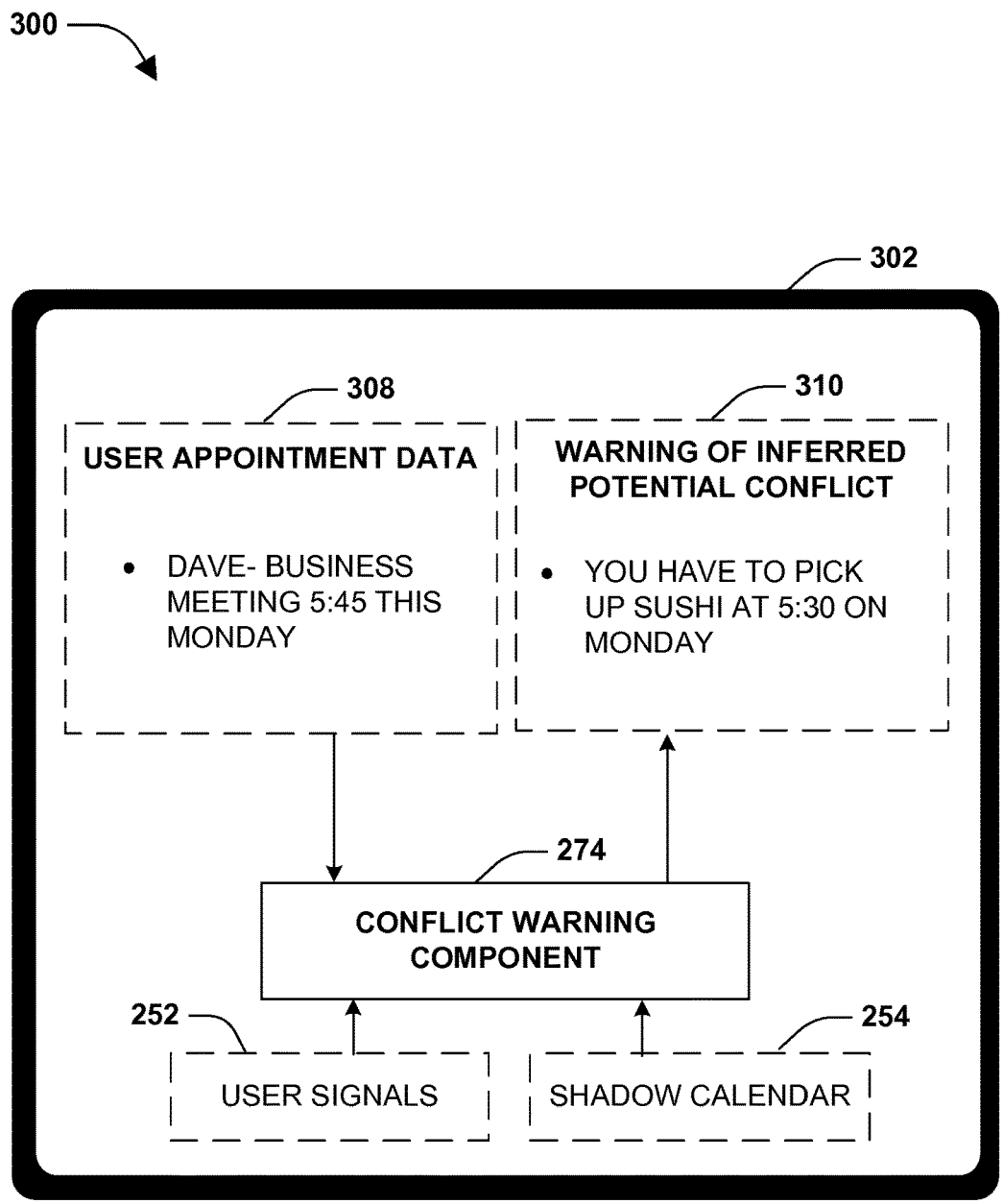
FIG. 3A is an illustration of an example of a conflict warning component associated with a computing device of a first user.
Figure 3B:
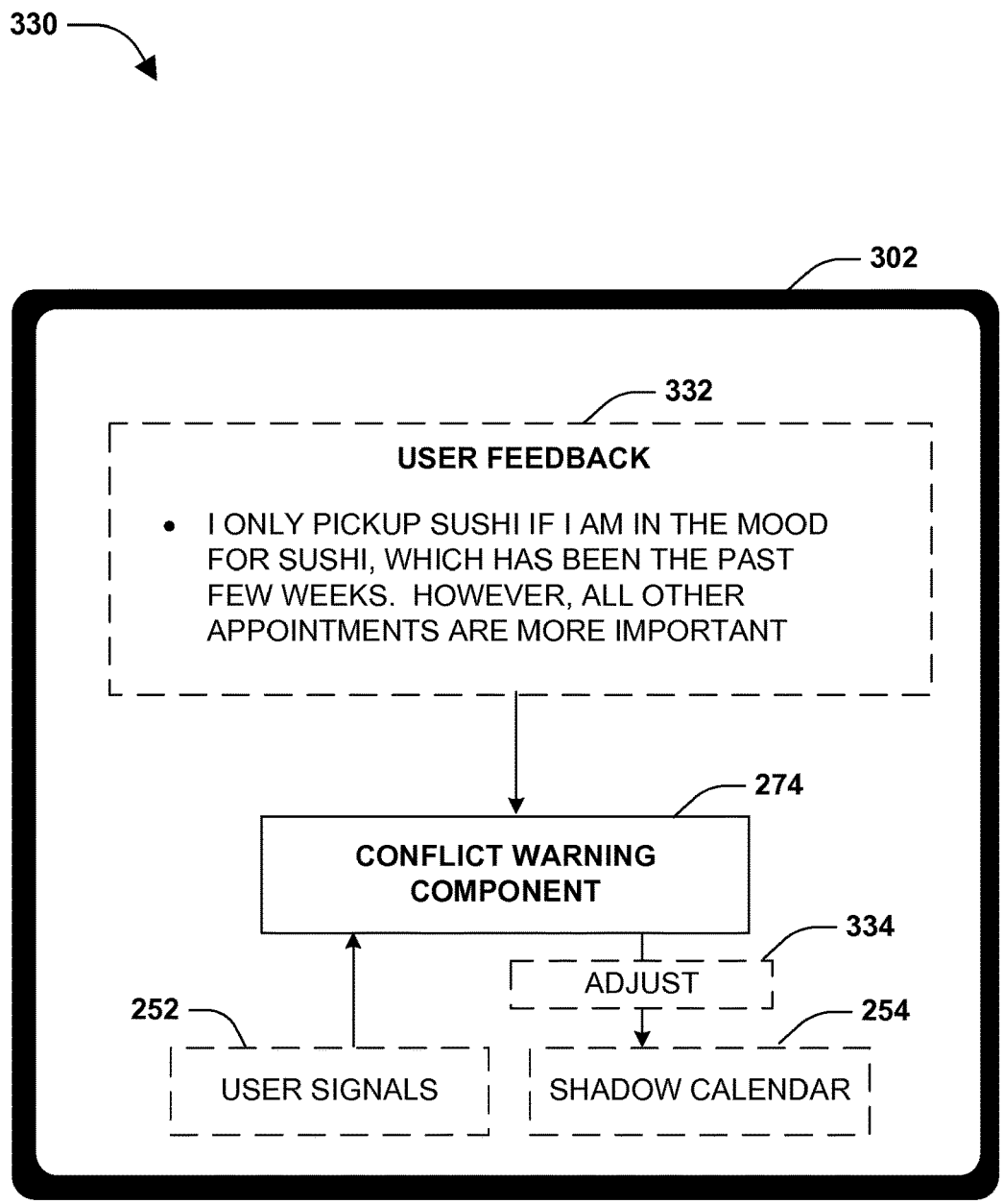
FIG. 3B is an illustration of an example of utilizing user feedback for a warning to improve user behavior pattern recognition.

FIGS. 3A-3B illustrate examples of surfacing a warning of a potential conflict and adjusting a first user inferred behavior pattern based upon user feedback for the warning. FIG. 3A illustrates an example 300 of a conflict warning component 274 associated with a computing device 302 of a first user. The conflict warning component 274 may identify user appointment data 308 for the first user (e.g., a user work calendar). For example, the conflict warning component 274 may identify a Monday business meeting at 5:45 pm user appointment within the user appointment data 308. The conflict warning component 274 may evaluate user signals 252 and/or a shadow calendar 254, as illustrated in FIGS. 2A-2B, to identify the first user inferred behavior pattern for the first user. For example, the first user inferred behavior pattern may indicate that the user routinely picks up sushi at 5:30 pm on Mondays. The conflict warning component 274 may identify a potential conflict between the Monday business meeting at 5:45 pm user appointment and the first user inferred behavior pattern. Accordingly, the conflict warning component 274 may provide a warning 310 of the potential conflict, such as through a user interface of the computing device 302. The warning 310 may indicate that the user picks up sushi at 5:30 pm on Mondays, which may conflict with the Monday business meeting at 5:45 pm user appointment.

FIG. 3B illustrates an example 330 of utilizing user feedback 332 for the warning 310, illustrated in FIG. 3A, to improve user behavior pattern recognition. For example, the conflict warning component 274 may receive the user feedback 332 indicating that the user only picks up sushi if the user is in the mood for sushi, which has been the case in the past few weeks, and that all other user appointments are more important than picking up sushi. Accordingly, the conflict warning component 274 may adjust 334 the shadow calendar 254, illustrated in FIG. 2B, based upon the user feedback 332. In an example, a pickup sushi activity shadow calendar entry may be modified (e.g., a confidence rating may be decreased; a condition or rule that user appointments are more important than the pickup sushi activity shadow calendar entry may be created, etc.) or removed from the shadow calendar 254 based upon the user feedback 332.

Figure 4:
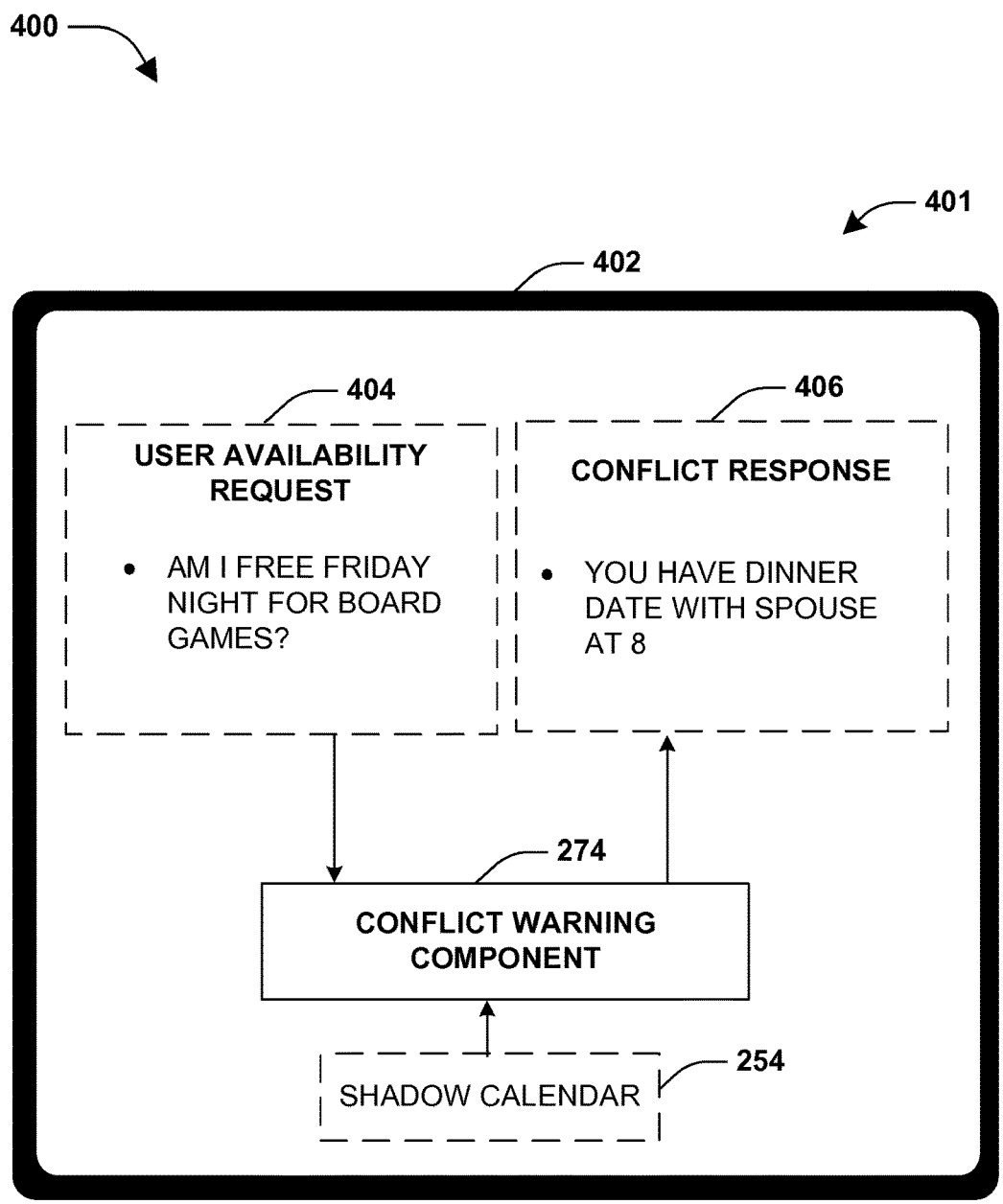
FIG. 4 is a component block diagram illustrating an exemplary system for responding to user availability requests.

FIG. 4 illustrates an example 400 of a system 401 for responding to user availability requests. The system 401 may comprise a conflict warning component 274 associated with a computing device 402 of a first user. The conflict warning component 274 may receive a user availability request 404 from the first user (e.g., a voice command "am I free Friday night for board games?" may be received through the computing device 402). The user availability request 404 may specify a potential user appointment, such as playing board games Friday night. The conflict warning component 274 may access a shadow calendar 254, as illustrated in FIG. 2B, to identify one or more shadow calendar entries, such as a dinner date with spouse shadow calendar activity entry indicating that the user has a dinner date with spouse on Friday at 8:00 pm. The conflict warning component 274 may provide a conflict response 406 to the first user such as through a user interface of the computing device 402, where the conflict response indicates, for example, that the first user has a dinner date with spouse Friday night that conflicts with the potential user appointment to play board games on Friday night.

Figure 5:
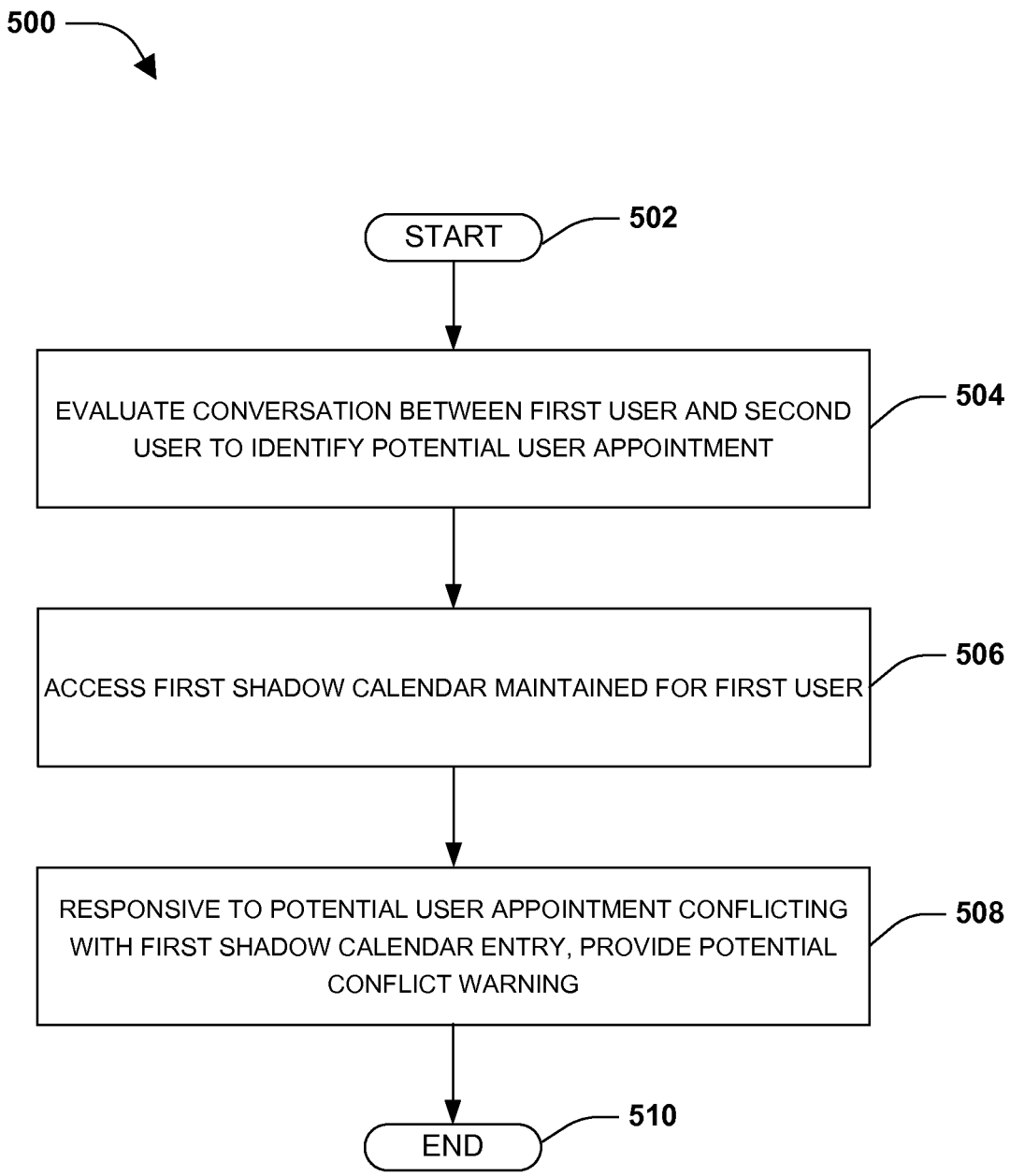
FIG. 5 is a flow diagram illustrating an exemplary method of facilitating appointment scheduling based upon conflict detection.

An embodiment of facilitating appointment scheduling based upon conflict detection is illustrated by an exemplary method 500 of FIG. 5. At 502, the method starts. At 504, a conversation between a first user and a second user may be evaluated to identify a potential user appointment. For example, a first user and/or other users may provide affirmative opt-in consent to allow a computing device (e.g., a smart phone, a tablet, a personal computer, a videogame console, a vehicle computing system, a computing watch, etc.) to evaluate audio and/or visual information associated with the first user and/or other users. The first user and the second user may be communicating about meeting up to play tennis next Wednesday at 4:00 pm, which may be identified as the potential user appointment.

At 506, a first shadow calendar maintained for the first user may be accessed to identify one or more first shadow calendar entries inferred (e.g., with user consent) from behavior patterns of the first user (e.g., a first shadow calendar entry may indicate that the first user routinely picks up a daughter from swim lessons at 3:45 pm on Wednesdays). In an example where the second user has provided affirmative opt-in consent to allow access to a second shadow calendar maintained for the second user, the second shadow calendar may be accessed to identify one or more second shadow calendar entries inferred (e.g., with user consent) from behavior patterns of the second user (e.g., a second shadow calendar entry may indicate that the second user routinely exercises from 2:00 pm-3:30 pm on Wednesdays).

At 508, responsive to the potential user appointment conflicting with at least one of the one or more first shadow calendar entries, a potential conflict warning may be provided. The potential conflict warning may indicate that the user routinely picks up the daughter from swim lessons at 3:45 pm on Wednesdays, which may conflict with playing tennis at 4:00 pm on next Wednesday. Responsive to the potential user appointment conflicting with at least one of the one or more second shadow calendar entries for the second user, the potential conflict warning may be provided. In an example, the potential conflict warning may be provided in real-time during the conversation. In an example, an appointment suggestion may be provided for the potential user appointment based upon the first shadow calendar and/or the second shadow calendar. For example, a new proposed tennis time of 5:30 pm may be proposed because the first user is no longer transporting the daughter after 4:45 pm and the second user is free from the gym after 3:30 pm. At 510, the method ends.

Figure 6A:
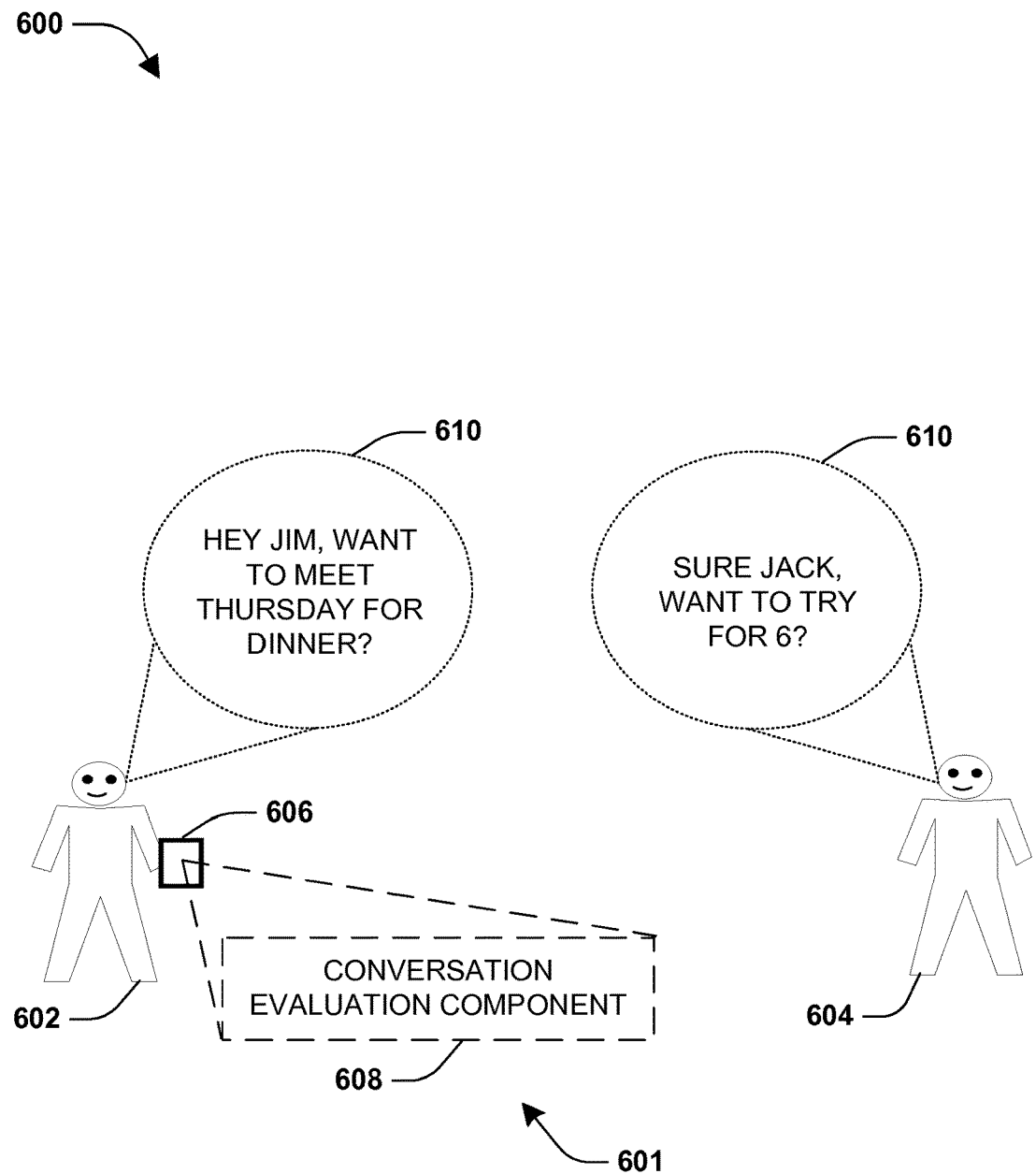
FIG. 6A is a component block diagram illustrating an exemplary system for facilitating appointment scheduling based upon conflict detection.
Figure 6B:
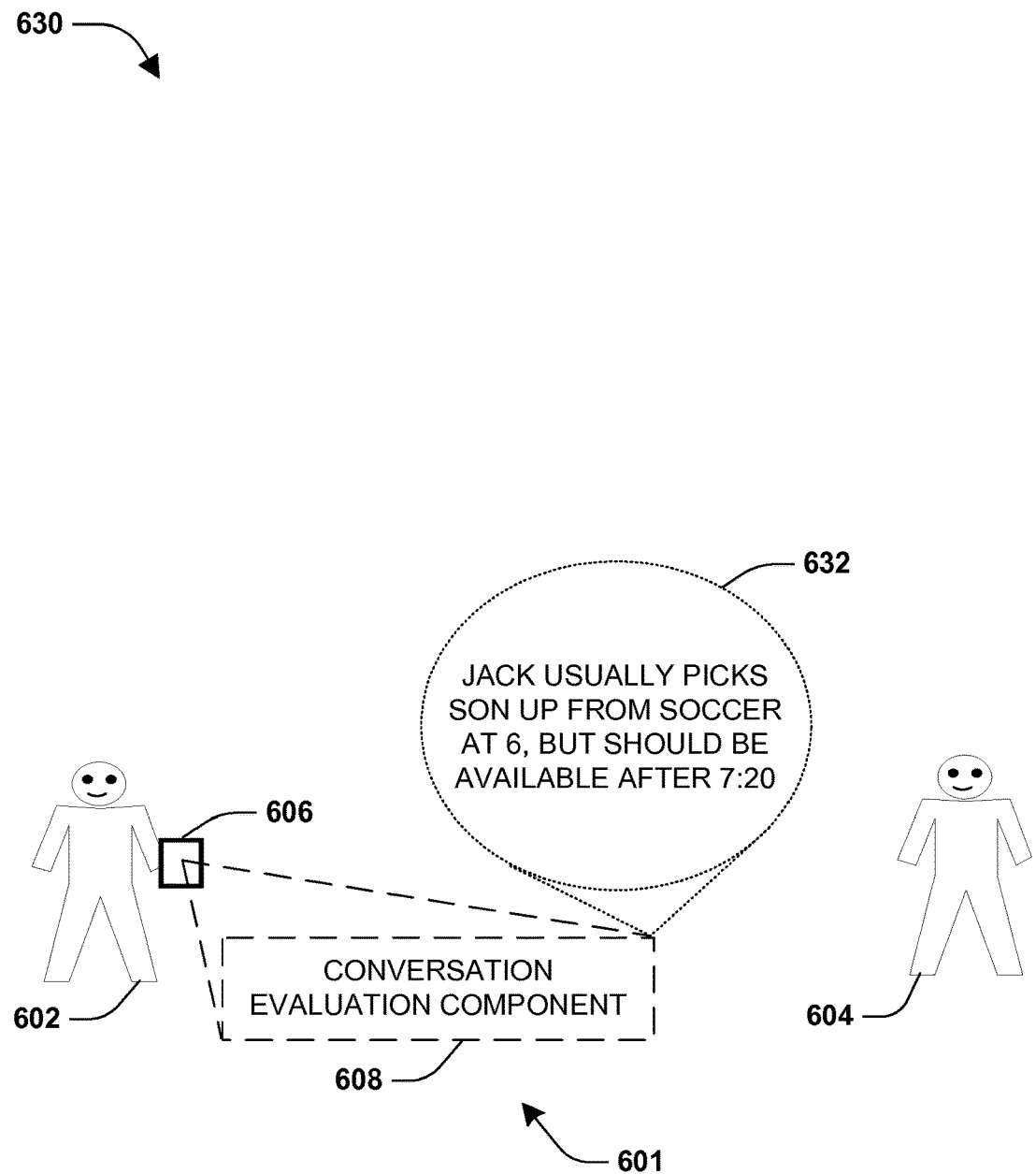
FIG. 6B is a component block diagram illustrating an exemplary system for facilitating appointment scheduling based upon conflict detection.

FIGS. 6A-6B illustrate examples of a system 601 for facilitating appointment scheduling based upon conflict detection. FIG. 6A illustrates an example 600 of the system 601 comprising a conversation evaluation component 608. In an example, the conversation evaluation component 608 may be hosted on a computing device 606 associated with a first user 602 Jack. The first user 602 Jack and/or a second user 604 Jim may provide affirmative opt-in consent to allow the conversation evaluation component 608 to evaluate a conversation (e.g., audio and/or visual information) between the first user 602 Jack and the second user 604 Jim such as for conflict detection and/or appointment scheduling purposes. For example, the conversation evaluation component 608 may evaluate a dinner conversation 610 to identify a potential user appointment between the first user 602 Jack and the second user 604 Jim to meet for dinner on Thursday around 6:00 pm.

FIG. 6B illustrates an example 630 of providing a potential conflict warning 632 with an appointment suggestion. The conversation evaluation component 608 may evaluate a first shadow calendar (e.g., derived with user consent) for the first user 602 Jack and/or a second shadow calendar (e.g., derived with user consent) for the second user 604 Jim to determine that the potential user appointment of dinner on Thursday at 6:00 pm may conflict with the first user 602 Jack's usual routine of picking a son up from soccer practice at 6:00 pm. Accordingly, the conversation evaluation component 608 may provide the potential conflict warning 632 with the appointment suggestion to schedule dinner for 7:20 pm or later.

Figure 7:
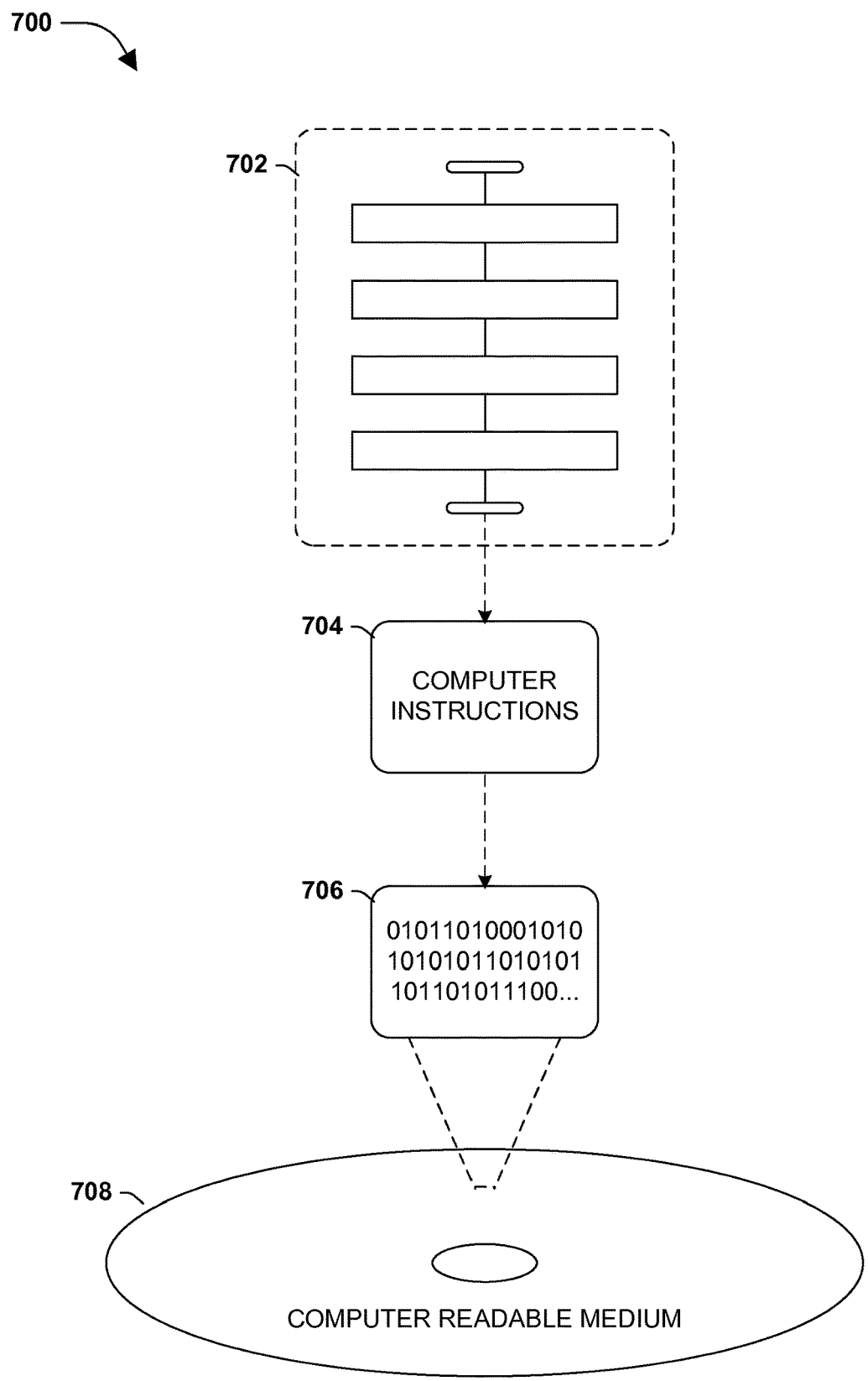
FIG. 7 is an illustration of an exemplary computer readable medium wherein processor-executable instructions configured to embody one or more of the provisions set forth herein may be comprised.

Still another embodiment involves a computer-readable medium comprising processor-executable instructions configured to implement one or more of the techniques presented herein. An example embodiment of a computer-readable medium or a computer-readable device is illustrated in FIG. 7, wherein the implementation 700 comprises a computer-readable medium 708, such as a CD-R, DVD-R, flash drive, a platter of a hard disk drive, etc., on which is encoded computer-readable data 706. This computer-readable data 706, such as binary data comprising at least one of a zero or a one, in turn comprises a set of computer instructions 704 configured to operate according to one or more of the principles set forth herein. In some embodiments, the processor-executable computer instructions 704 are configured to perform a method 702, such as at least some of the exemplary method 100 of FIG. 1 and/or at least some of the exemplary method 500 of FIG. 5, for example. In some embodiments, the processor-executable instructions 704 are configured to implement a system, such as at least some of the exemplary system 271 of FIG. 2C, at least some of the exemplary system 401 of FIG. 4, and/or at least some of the exemplary system 601 of FIGS. 6A-6B, for example. Many such computer-readable media are devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

As used in this application, the terms "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 8:
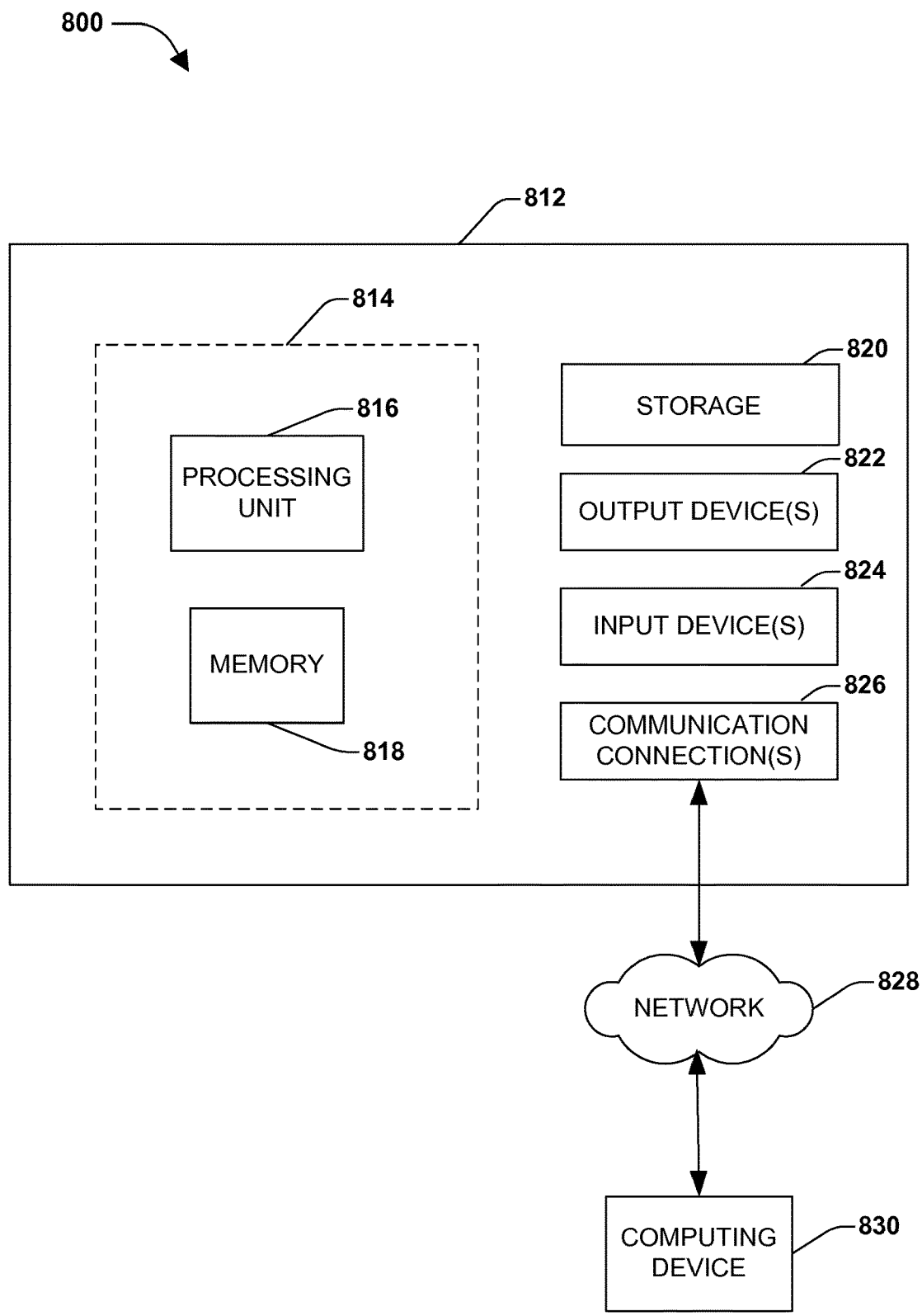
FIG. 8 illustrates an exemplary computing environment wherein one or more of the provisions set forth herein may be implemented.

FIG. 8 and the following discussion provide a brief, general description of a suitable computing environment to implement embodiments of one or more of the provisions set forth herein. The operating environment of FIG. 8 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 8 illustrates an example of a system 800 comprising a computing device 812 configured to implement one or more embodiments provided herein. In one configuration, computing device 812 includes at least one processing unit 816 and memory 818. Depending on the exact configuration and type of computing device, memory 818 may be volatile (such as RAM, for example), non-volatile (such as ROM, flash memory, etc., for example) or some combination of the two. This configuration is illustrated in FIG. 8 by dashed line 814.

In other embodiments, device 812 may include additional features and/or functionality. For example, device 812 may also include additional storage (e.g., removable and/or non-removable) including, but not limited to, magnetic storage, optical storage, and the like. Such additional storage is illustrated in FIG. 8 by storage 820. In one embodiment, computer readable instructions to implement one or more embodiments provided herein may be in storage 820. Storage 820 may also store other computer readable instructions to implement an operating system, an application program, and the like. Computer readable instructions may be loaded in memory 818 for execution by processing unit 816, for example.

The term "computer readable media" as used herein includes computer storage media. Computer storage media includes volatile and nonvolatile, removable and non-removable media implemented in any method or technology for storage of information such as computer readable instructions or other data. Memory 818 and storage 820 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 812. Computer storage media does not, however, include propagated signals. Rather, computer storage media excludes propagated signals. Any such computer storage media may be part of device 812.

Device 812 may also include communication connection(s) 826 that allows device 812 to communicate with other devices. Communication connection(s) 826 may include, but is not limited to, a modem, a Network Interface Card (NIC), an integrated network interface, a radio frequency transmitter/receiver, an infrared port, a USB connection, or other interfaces for connecting computing device 812 to other computing devices. Communication connection(s) 826 may include a wired connection or a wireless connection. Communication connection(s) 826 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 812 may include input device(s) 824 such as keyboard, mouse, pen, voice input device, touch input device, infrared cameras, video input devices, and/or any other input device. Output device(s) 822 such as one or more displays, speakers, printers, and/or any other output device may also be included in device 812. Input device(s) 824 and output device(s) 822 may be connected to device 812 via a wired connection, wireless connection, or any combination thereof. In one embodiment, an input device or an output device from another computing device may be used as input device(s) 824 or output device(s) 822 for computing device 812.

Components of computing device 812 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 812 may be interconnected by a network. For example, memory 818 may be comprised of multiple physical memory units located in different physical locations interconnected by a network.

Those skilled in the art will realize that storage devices utilized to store computer readable instructions may be distributed across a network. For example, a computing device 830 accessible via a network 828 may store computer readable instructions to implement one or more embodiments provided herein. Computing device 812 may access computing device 830 and download a part or all of the computer readable instructions for execution. Alternatively, computing device 812 may download pieces of the computer readable instructions, as needed, or some instructions may be executed at computing device 812 and some at computing device 830.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description.

Further, it will be understood that not all operations are necessarily present in each embodiment provided herein. Also, it will be understood that not all operations are necessary in some embodiments.

Further, unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "exemplary" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", and/or variants thereof are used in either the detailed description or the claims, such terms are intended to be inclusive in a manner similar to the term "comprising".

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method for surfacing scheduling conflicts, comprising:
   generating, by a computing device, a first inferred calendar entry for an inferred event associated with a first user inferred behavior pattern from a set of user signals for a first user, wherein the set of user signals does not include an explicit calendar entry defined by the first user;
   evaluating user appointment data for the first user to identify a potential conflict between a user appointment for the first user and the first inferred calendar entry;
   providing, by the computing device, a warning of the potential conflict to the first user;
   receiving user feedback associated with the warning; and
   modifying, the first inferred calendar entry based on the user feedback.

2. The method of claim 1, wherein warning comprises: providing a reschedule user appointment suggestion to the first user.

3. The method of claim 1, wherein the received user feedback comprises a priority indication relating to the first inferred calendar entry.

4. The method of claim 1, comprising:
   evaluating a conversation between the first user and a second user to identify the user appointment data.

5. The method of claim 1, the evaluating a set of user signals comprising:
   accessing a first shadow calendar maintained for the first user to identify the first user inferred behavior pattern.

6. The method of claim 1, comprising:
   evaluating a social network profile of the first user to identify an activity of the first user as a user signal of the set of user signals.

7. The method of claim 1, comprising:
   evaluating a device context of a device to identify an activity of the first user as a user signal of the set of user signals, the device context comprising at least one of: a device location, a device time, a mode of transportation, a device location check-in, an alarm, a charging state, a connectivity state, or user data stored on the device.

8. The method of claim 1, comprising:
   providing a notification of the potential conflict to an appointment creator of the user appointment.

9. The method of claim 1, comprising:
   receiving a user availability request from the first user, the user availability request specifying a potential user appointment;
   accessing a shadow calendar maintained for the first user to identify one or more shadow calendar entries, at least one shadow calendar entry corresponding to the first user inferred behavior pattern;
   responsive to the potential user appointment conflicting with a shadow calendar entry, providing a conflict response; and
   responsive to the potential user appointment not conflicting with at least one shadow calendar entry, providing an availability confirmation.

10. The method of claim 9, the providing a conflict response comprising:
    providing an availability suggestion for the potential user appointment.

11. The method of claim 1, wherein warning comprises: providing an audible notification of the warning.

12. The method of claim 1, wherein warning comprises: providing a mobile alert of the warning.

13. A system for surfacing scheduling conflicts, comprising:
    at least one processor; and
    a memory storing instructions that, when executed by the at least one processor, perform a set of operations, comprising:
      generate a first inferred calendar entry for an inferred event associated with a first user inferred behavior pattern from a set of user signals for a first user, wherein the set of user signals does not include an explicit calendar entry defined by the first user;
      evaluate user appointment data for the first user to identify a potential conflict between a user appointment for the first user and the first inferred calendar entry;
      provide a warning of the potential conflict to the first user,
      receive user feedback associated with the warning; and
      modify the first inferred calendar entry based on the user feedback.

14. The system of claim 13, wherein the operations further comprise:

evaluate a conversation between the first user and a second user to identify a potential user appointment;

access a first shadow calendar maintained for the first user to identify one or more first shadow calendar entries, at least one shadow calendar entry corresponding to the first user inferred behavior pattern; and responsive to the potential user appointment conflicting with at least one of the one or more first shadow calendar entries, provide a potential conflict warning.

15. The system of claim 14, wherein the operations further comprise:

access a second shadow calendar maintained for the second user to identify one or more second shadow calendar entries inferred from behavior patterns of the second user; and responsive to the potential user appointment conflicting with at least one of the one or more second shadow calendar entries, provide the potential conflict warning.

16. The system of claim 13, wherein the user feedback associated with the warning comprises at least one user indication selected from the group consisting of:

a user indication to remove the first inferred calendar entry;

a user indication to adjust a confidence metric associated with the first inferred calendar entry;

a user indication to disregard the potential conflict; and a user indication to reschedule the user appointment.

17. A computer storage media comprising instructions that, when executed, perform a method for facilitating appointment scheduling based upon conflict detection, comprising:

generating a first inferred calendar entry for an inferred event associated with a first user inferred behavior pattern from a set of user signals for a first user, wherein the set of user signals does not include an explicit calendar entry defined by the first user;

evaluating a second set of user signals from a second user to generate a second user inferred behavior pattern;

generating a second inferred calendar entry indicating an inferred event based on the first user inferred behavior pattern;

evaluating the first user inferred behavior pattern and the second user inferred behavior pattern to identify a time for a user appointment, wherein the identified time does not conflict with the first inferred calendar entry and the second inferred calendar entry;

providing an appointment time suggestion based on the identified time;

receiving user feedback associated with the appointment time suggestion; and modifying at least one of the first inferred calendar entry and the second inferred calendar entry based on the user feedback.

18. The computer storage media of claim 17, wherein providing the appointment time suggestion comprises:

providing the appointment time suggestion during a conversation between the first user and the second user relating to the user appointment.

19. The computer storage media of claim 17, wherein providing the appointment time suggestion comprises:

presenting the first user inferred behavior pattern and the second user inferred behavior pattern to indicate one or more available appointment times.

20. The computer storage media of claim 17, wherein the received user feedback comprises a priority indication relating to the first inferred calendar entry.

* * * * *